United States Patent Office.

WILLIAM B. MIDDLETON, OF LANCASTER, PENNSYLVANIA.

METHOD OF WELDING STEEL.

SPECIFICATION forming part of Letters Patent No. 372,696, dated November 8, 1887.

Application filed June 9, 1887. Serial No. 240,828. (No specimens.)

*To all whom it may concern:*

Be it known that I, WILLIAM BULLUS MIDDLETON, a citizen of the United States, residing at the city of Lancaster, in the State of Pennsylvania, have invented a new and useful Method of Welding Steel, of which the following is a description.

The perfect welding together of pieces of steel, as is well known, has, until within a few years past, been considered almost impossible, and, in fact up to the present time, no method of welding together pieces of this metal has been devised which has been wholly successful or fruitful of commercially valuable results.

It has been said that the facility with which steel may be welded to steel diminishes as the metal approximates to cast iron with respect to the proportion of carbon, or that, in other words, the facility of welding pieces of this metal increases as the metal approximates to wrought iron with respect to the absence of carbon. The theory, with others, that the steel to be welded, on being exposed to the necessary welding heat, becomes "burnt" or partially oxidized, has been urged as a reason to account for the difficulty of welding together pieces of this metal; the absence of a satisfactory method of welding has resulted in the waste of a great quantity of Bessemer and other scrap steel which otherwise could and would have been employed for a great variety of purposes in the useful arts.

I have discovered that pieces of steel may, at a proper welding heat, be perfectly, cheaply, and easily welded together after the pieces to be welded have been coated or treated with a solution of silicate of soda, or other solution in which silica is contained.

In the practice of my invention I have obtained highly satisfactory results by applying a solution of silicate of soda to the pieces of steel to be welded by dipping said pieces in said solution, or by pouring it upon them, bunching together the pieces to be welded and heating them to an ordinary welding heat, and then passing them through welding rolls of ordinary and well known construction.

I do not confine myself to the use of a solution of silicate of soda as a solution of other silicates or of silica, or of a silica bearing material may be employed for the purpose. The application of the solution to the pieces of steel to be welded may be made in any convenient or desired manner.

I do not confine myself to the application of the solution to the pieces of steel to be welded at any particular time before their passage through the welding rolls, nor do I confine myself to the use of rolls to effectuate the welding operation as this step may be accomplished by the use of hammers, stamps or other mechanical devices suitable for the welding together of metals.

I am aware that various methods of welding pieces of steel together have been proposed in which oxide of zinc, sand, fluor spar, silica, alum, and other substances, in a dry and powdered form, have been named as welding fluxes. To these I make no claim. In each of these methods it has been proposed to deposit the powdered flux upon the pieces of steel to be welded before introducing them to the heating furnace, or to blow the powdered flux into the furnace during the operation of heating said pieces. The result of each of the methods named has been unsatisfactory, and the weld faulty and imperfect, for the reason that it has been impossible to evenly and perfectly apply the powdered flux to all parts of the surfaces to be welded, or to, in the handling of the pieces of metal, retain the flux upon said surfaces. By my invention a method of fluxing is provided in which every part of the pieces of steel to be welded is completely coated with flux. Further, in the practice of my invention, the method of the application of the flux to the metal to be welded is simple, easy, and economical, and the result obtained is successful and valuable.

Having thus described my invention, I claim:—

The method of fluxing, and welding together, pieces of Bessemer or other steel, which consists in treating them with a solution of silicate of soda, or solution of other silicate, or solution of silica, and then, at a welding heat, subjecting said pieces to a welding pressure in rolls, under the hammer, or otherwise, as specified.

In testimony whereof I have hereunto signed my name this 23rd day of May, A. D. 1887.

WM. B. MIDDLETON.

In presence of—
WILLIAM A. MORTON,
WM. C. STRAWBRIGE.